2,919,295
Patented Dec. 29, 1959

2,919,295

STABILIZATION OF CHLORINATED HYDROCARBONS

Fred W. Starks, Kenmore, N.Y., assignor to E. I. du Pont de Nemours and Company, Wilmington, Del., a corporation of Delaware No Drawing. Application November 29, 1957
Serial No. 699,486

7 Claims. (Cl. 260—652.5)

This invention relates to chlorinated hydrocarbons stabilized by the addition thereto of small amounts of certain chemicals. It relates particularly to trichlorethylene and perchlorethylene.

The removal of grease films from metallic surfaces has been practiced for many years. Generally, the removal is accomplished by suspending the metal to be degreased in a boiling fat-solvent at atmospheric pressure. Suitable fat-solvents including particularly the chlorinated hydrocarbons, of which trichlorethylene, perchlorethylene, tetrachlorethane and ethylene chloride are representative, but others may be utilized as well.

Trichlorethylene is probably the solvent most widely used in such operations. It is, however, seldom used in the pure state. Instead, stabilizing agents are usually added to prevent decomposition under the conditions of storage and utility. Light and oxygen, for example, decompose trichlorethylene very rapidly. Heat is also deleterious to this solvent and may accelerate the effects of light and oxygen. Unless precautions are taken, decomposition from heat, light and oxygen takes place under ordinary conditions. This type of decomposition may, therefore, be called "normal." Many compounds are known which, in trace amounts, will inhibit normal decomposition.

Another type of decomposition occurs when the workpiece to be degreased is made of aluminum or an aluminum alloy. The stabilizers effective to prevent decomposition by oxygen, light or heat are, in general, powerless against decomposition caused by aluminum. Resultant solvent degradation is made manifest by a rapid increase in acidity, discoloration of the solvent media and formation of black oils and tar. The same type of decomposition is also noted but in smaller degree in iron degreasing.

The causes of this metal induced decomposition are not exactly known. However, it is evident that whatever the mechanism, its initiation probably involves the production of hydrogen chloride. Hydrogen chloride may result from air oxidation of the chlorinated hydrocarbon, the decomposition of the chlorinated cutting oils frequently removed from metallic workpieces by degreasing or the catalytic effect of metal surfaces on these chlorinated compounds. This hydrogen chloride then reacts with the metal surface forming halide salts. When metallic aluminum or an aluminum alloy is being degreased, aluminum chloride is formed and this salt is an extremely active catalyst for the decomposition of chlorinated solvents, such as trichlorethylene and perchlorethylene. Solvent degradation is evidenced by a rapid rise in temperature and pronounced discoloration. In advanced stages, there is formed a black, tarry mass which may deposit on the workpiece. The same phenomenon may also be observed in iron degreasing where ferric chloride is a decomposition catalyst, but to a much lesser extent. In any event, it has heretofore been necessary to shut down operations and to remove nonvolatiles and metal fines at frequent intervals. Such shut-downs entail additional labor, loss of production and loss of solvent. Hence, this metal induced decomposition detracts from the economics of the degreasing process.

A major object of this invention, is therefore, provision of a novel and useful method of stabilizing chlorinated hydrocarbons, particularly trichlorethylene and perchlorethylene.

Another object is provision of a method for stabilizing chlorinated hydrocarbons against decomposition induced by metals, aluminum in particular.

An additional object is provision of a chlorinated hydrocarbon stabilized against decomposition induced by aluminum.

The above-mentioned and still further objects may be accomplished in the spirit of this invention by dissolving a small amount of an organic sulfoxide in trichlorethylene or perchlorethylene.

The sulfoxides of this invention are compounds possessing the type formula:

where R and R' represent aliphatic, araliphatic or aromatic hydrocarbon radicals which may be the same or different. The hydrocarbon radicals represented by R and R' may also carry substantially inert substituents, such as halogen atoms, hydroxyl groups, alkoxy groups, etc., which do not react with or decompose halogenated degreasing solvents or corrode metals. Compounds of this type include dimethyl sulfoxide, diethyl sulfoxide, bis-(2-hydroxyethyl) - sulfoxide, bis-(2-chlorethyl)-sulfoxide, bis-(2-ethoxyethyl)-sulfoxide, di-n-propyl sulfoxide, di-n-butyl sulfoxide, di-n-heptyl sulfoxide, diphenyl sulfoxide and dibenzyl sulfoxide.

The quantity of sulfoxide required for effective stabilization of the chlorinated hydrocarbons is not very great, but will vary to some extent with the individual compound. In general between about 0.5% and 5% by weight of the additive is effective. However, definite stabilization takes place when as little as about 0.01% of the additive is dissolved in the chlorinated hydrocarbon. The sulfoxides are compatible with the stabilizing agents normally present in chlorinated hydrocarbons. Consequently, these sulfoxides are readily employed in combination with the stabilizers that inhibit normal decomposition.

There follow some examples which illustrate details of the invention. In these examples, the presence of aluminum chloride simulates stringent operating conditions in a metal degreaser. All pressures are those of the ambient atmosphere and all concentrations are in percent by weight.

*Example 1*

This example shows the decomposition of trichlorethylene in the absence of the stabilizers of this invention on exposure to aluminum chloride. The trichlorethylene employed in this and subsequent examples contained small concentrations of p-tertiary amyl phenol and triethylamine. The phenol derivative is commonly employed to prevent normal decomposition whereas the latter neutralizes small quantities of hydrogen chloride which may be formed. A 100 ml. sample of this stabilized trichlorethylene and 0.5 g. of anhydrous aluminum chloride were placed in a flask equipped with a reflux condenser and heated to boiling. Decomposition was extremely rapid and the sample was black, opaque and contained a large amount of black precipitate by the time it reached reflux temperature. It was then flooded with water to arrest the exothermic decomposition reaction.

Example 2

A 100 ml. sample of the trichlorethylene stock employed in Example 1 was additionally stabilized by the addition of 0.5% of dimethyl sulfoxide giving a colorless solution. This solution and 0.5 g. anhydrous aluminum chloride were then placed in flask equipped with a reflux condenser and boiled for seventy hours and thirty minutes. When the refluxing commenced the material was white and frothy and showed no change for five minutes after which a slight darkening in color became evident. When the refluxing had been completed, the sample was a light grey in color and contained a small amount of sediment.

Example 3

A 100 ml. of the trichlorethylene stock employed in the previous examples in which 0.5% of diphenyl sulfoxide had been dissolved was placed in a flask with 0.5 g. aluminum chloride. The flask was equipped with a reflux condenser and the contents were refluxed for 72.5 hours. The boiling material was originally white and frothy. Very little color developed on heating and the sample was light colored, but slightly cloudy when the reflux period was complete. A small amount of white sediment was also noted.

Example 4

Approximately 0.5% of bis-(2-hydroxyethyl)-sulfoxide was added to 100 ml. of the trichlorethylene stock, but only a trace of this material dissolved. The solution was then treated with 0.5 g. of anhydrous aluminum chloride and boiled for 72 hours in a flask equipped with a reflux condenser. The solution soon developed a brown color. After 72 hours, the solution was black and contained a moderate amount of sediment. Solubility tests indicated that the hydroxyethyl sulfoxide was practically insoluble and that the solution probably contained not more than about 0.01%. However, in spite of the low concentration of sulfoxide in solution, very little solvent decomposed on refluxing 72 hours.

It should be noted that numerous variations are possible without departing from the spirit of this invention. Perchlorethylene may be employed in place of trichlorethylene as previously pointed out. This solvent is more stable with respect to aluminum chloride catalyzed decomposition and, consequently, requires less sulfoxide for protection. A wide variety of sulfoxides can be used as stabilizers provided they are soluble in the chlorinated solvent. The sulfoxide stabilizers can also be used in combination with the various other stabilizers used to protect chlorinated solvents against normal decomposition as well as the various acid acceptors such as triethylamine, pyridine and other antacids.

Having described my invention, I claim:

1. The method of stabilizing trichlorethylene which comprises dissolving therein 0.5 to 5% of dimethyl sulfoxide.
2. The method of stabilizing trichlorethylene which comprises dissolving therein 0.5 to 5% diphenyl sulfoxide.
3. The method of stabilizing perchlorethylene which comprises dissolving therein 0.5 to 5% of dimethyl sulfoxide.
4. Trichlorethylene containing 0.5 to 5% of dimethyl sulfoxide and thereby stabilized against metal-induced decomposition.
5. Trichloroethylene containing 0.5 to 5% of diphenyl sulfoxide and thereby stabilized against metal-induced decomposition.
6. The method of stabilizing a chlorinated hydrocarbon selected from the group consisting of trichlorethylene and perchlorethylene which comprises supplying thereto about 0.01 to 5% of an organic sulfoxide of the formula $$R-\underset{\underset{O}{\|}}{S}-R'$$

wherein R and R' are selected from the group consisting of substituted and unsubstituted aliphatic, araliphatic and aromatic radicals having from 1 to 7 C atoms, said substituted radicals being substituted with halogen, hydroxyl and alkoxy substituents.

7. A chlorinated hydrocarbon selected from the group consisting of trichlorethylene and perchlorethylene, said hydrocarbon being stabilized with about 0.01 to 5% of an organic sulfoxide of the formula $$R-\underset{\underset{O}{\|}}{S}-R'$$

wherein R and R' are selected from the group consisting of substituted and unsubstituted aliphatic, araliphatic and aromatic radicals having from 1 to 7 C atoms, said substituted radicals being substituted with halogen, hydroxyl and alkoxy substituents.

References Cited in the file of this patent

UNITED STATES PATENTS 2,742,509   Starks _____ Apr. 17, 1956